(12) United States Patent
Wade et al.

(10) Patent No.: US 6,707,771 B2
(45) Date of Patent: Mar. 16, 2004

(54) OPTICAL PICKUP DEVICE AND METHOD OF MANUFACTURING THE SAME

(75) Inventors: Tatsuki Wade, Nagano (JP); Hiroshi Sugihara, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 285 days.

(21) Appl. No.: 09/759,235

(22) Filed: Jan. 16, 2001

(65) Prior Publication Data

US 2001/0008505 A1 Jul. 19, 2001

(30) Foreign Application Priority Data

Jan. 14, 2000 (JP) ..................................... P. 2000-005544

(51) Int. Cl.⁷ ................................................. G11B 7/00
(52) U.S. Cl. ................................ 369/44.15; 369/44.16; 359/823
(58) Field of Search ........................... 369/30.5, 30.57, 369/44.14, 44.15, 44.16, 44.17, 44.18, 44.19, 44.32, 112.8, 219, 253, 214.15; 359/811, 813, 823

(56) References Cited

U.S. PATENT DOCUMENTS

| | | | | |
|---|---|---|---|---|
| 4,991,161 A | * | 2/1991 | Ikegame et al. | 369/44.16 |
| 5,523,891 A | * | 6/1996 | Fujisawa | 369/44.15 |
| 5,535,059 A | * | 7/1996 | Mitsumori et al. | 359/823 |
| 5,627,687 A | * | 5/1997 | Fujisawa | 359/823 |
| 5,673,152 A | * | 9/1997 | Yokota et al. | 359/824 |
| 5,768,034 A | * | 6/1998 | Marino | 369/44.15 |
| 5,877,904 A | * | 3/1999 | Kawano et al. | 369/44.15 |
| 6,091,553 A | * | 7/2000 | Song et al. | 369/44.14 |
| 6,341,104 B1 | * | 1/2002 | Yamaguchi et al. | 369/44.16 |
| 6,385,146 B1 | * | 5/2002 | Choi et al. | 369/44.16 |
| 6,480,460 B1 | * | 11/2002 | Ohkuma et al. | 369/44.16 |

FOREIGN PATENT DOCUMENTS

JP 4-49174 8/1992 ............ G11B/7/09

* cited by examiner

Primary Examiner—Doris H. To
Assistant Examiner—Jorge Ortiz-Criado
(74) Attorney, Agent, or Firm—Sughrue Mion, PLLC

(57) ABSTRACT

In an optical pickup device, wires 16A through 16D resiliently support a lens holder 12 in a cantilever fashion. Of the wires, wires 16A and 16C arranged so as to overlap when viewed in a tracking direction are fixed together by heat sealing. The wires 16B and 16D are arranged independently of each other. In each of the wires 16A through 16D, a portion 166 close to the base end of the wire is squeezed from a focusing direction, and a portion 167 close to the tip end of the wires is squeezed from the tracking direction.

10 Claims, 10 Drawing Sheets

BACKGROUND ART

FIG. 9

OPTICAL PICKUP DEVICE AND METHOD OF MANUFACTURING THE SAME

BACKGROUND OF THE INVENTION

The present invention relates to an optical pickup device and to a method of manufacturing the same. More particularly, the present invention relates to a technique of supporting an objective lens of an optical pickup device.

Figure 8:
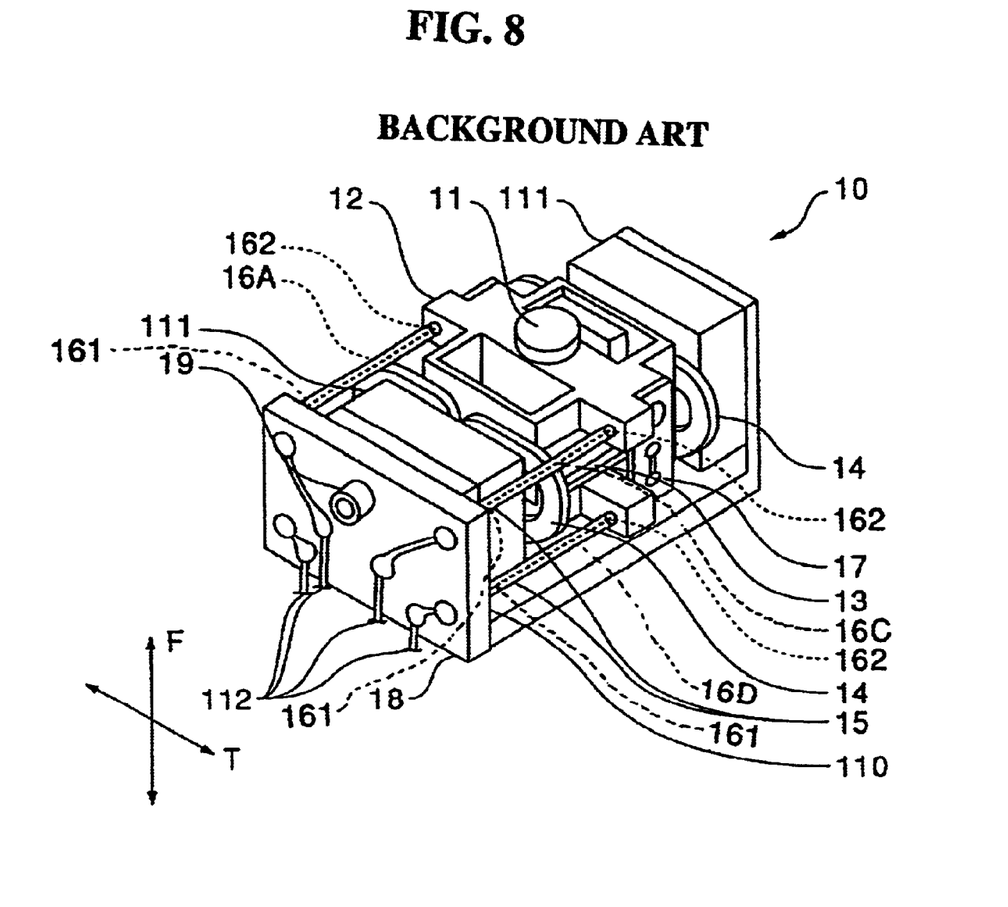
FIG. 8 is a perspective view showing the principal section of an optical pickup device.
Figure 9:
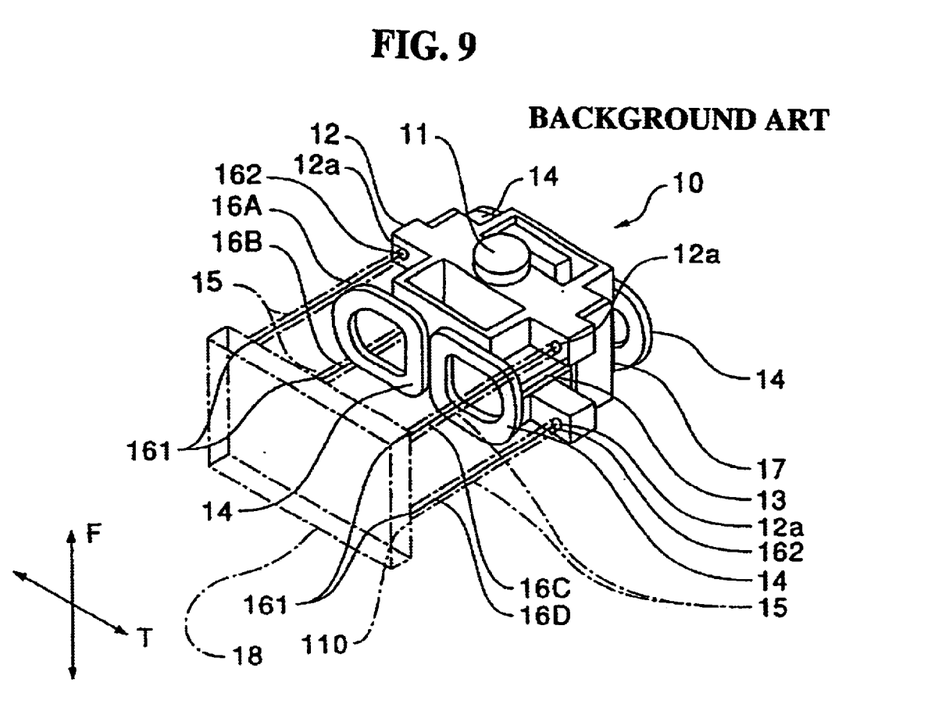
FIG. 9 is a perspective view showing the construction of the optical pickup device for supporting a lens holder.

An optical pickup device used for reproducing/recording information in an optical recording medium is described in, for example, Japanese Patent Publication No. 4-49174B2. As shown in FIGS. 8 and 9, the optical pickup device described in the publication has an objective lens 11 for converging a laser beam originating from a light source (not depicted) onto an optical recording medium (not depicted), and a lens holder 12 for sustaining the objective lens 11. A drive coil 13 for focus-correction purpose (hereinafter called "focus-correction drive coil 13") is wound around the lens holder 12. Further, a pair of drive coils 14 for tracking correction purpose (hereinafter called "tracking-correction drive coils 14") are bonded to each of opposed side faces of the lens holder 12.

In the optical pickup device 10, the lens holder 12 is elastically supported in a cantilever fashion by four metal wires 16A, 16B, 16C, and 16D. The four wires 16A, 16B, 16C, and 16D extend from a fixation member 110 and act as members for feeding power to the lens holder 12. The wires 16A to 16D are coated with insulation material 15 such as a rubber tube or resin. In each of the wires 16A to 16D, a base end 161 is fixed to the fixation member 110, and a leading end 162 passes through a hole 12a formed in opposed side faces of the lens holder 12, wherein the holes 12a are formed in upper and lower areas of the side faces. The leading end 162 is soldered to a printed board 17 disposed on either lateral side face of the lens holder 12.

The ends of the drive coil 13 and the ends of the drive coil 14 are soldered to the respective printed boards 17. The focus-correction drive coil 13 and the tracking-correction drive coils 14 are electrically connected to the four wires 16A through 16D by way of copper foil patterns of the printed boards 17.

The base end 161 of each of the wires 16 is soldered to a printed board 18 (i.e., the side of the printed board 18 on which is mounted the fixation member 110). The printed board 18 is fixed to the side of the C-shaped fixation member 110 through use of a screw 19. The fixation member 110 is formed from magnetic material, and two magnets 111 are bonded to the interior side of the fixation member 110, thus constituting a magnetic circuit in conjunction with the focus-correction drive coil 13 and the tracking-correction drive coils 14. Lead wires 112 are soldered to the printed board 18 and are electrically connected to the wires 16A through 16D by way of a copper foil pattern of the printed board 18.

In the optical pickup device 10 having the foregoing construction, when power is fed to the lead wires 112, power is fed to the focus-correction drive coil 13 or to the tracking-correction drive coils 14 by way of the wires 16A through 16D. By magnetic force developing between the focus-correction drive coil 13 or the tracking-correction drive coils 14 and the magnets 111, the lens holder 12 is moved in a focusing or tracking direction so as to oppose the elastic force of the wires 16A to 16D while deforming the wires 16A to 16D. Consequently, the objective lens 11 is also moved in either the focusing or tracking direction.

Accordingly, a laser beam originating from a light source (not depicted) is radiated onto a predetermined position on an optical recording medium by way of the objective lens 11. If the light reflected from the recording medium is detected, information can be recorded onto and reproduced from the optical recording medium.

Figures 10A, 10B:
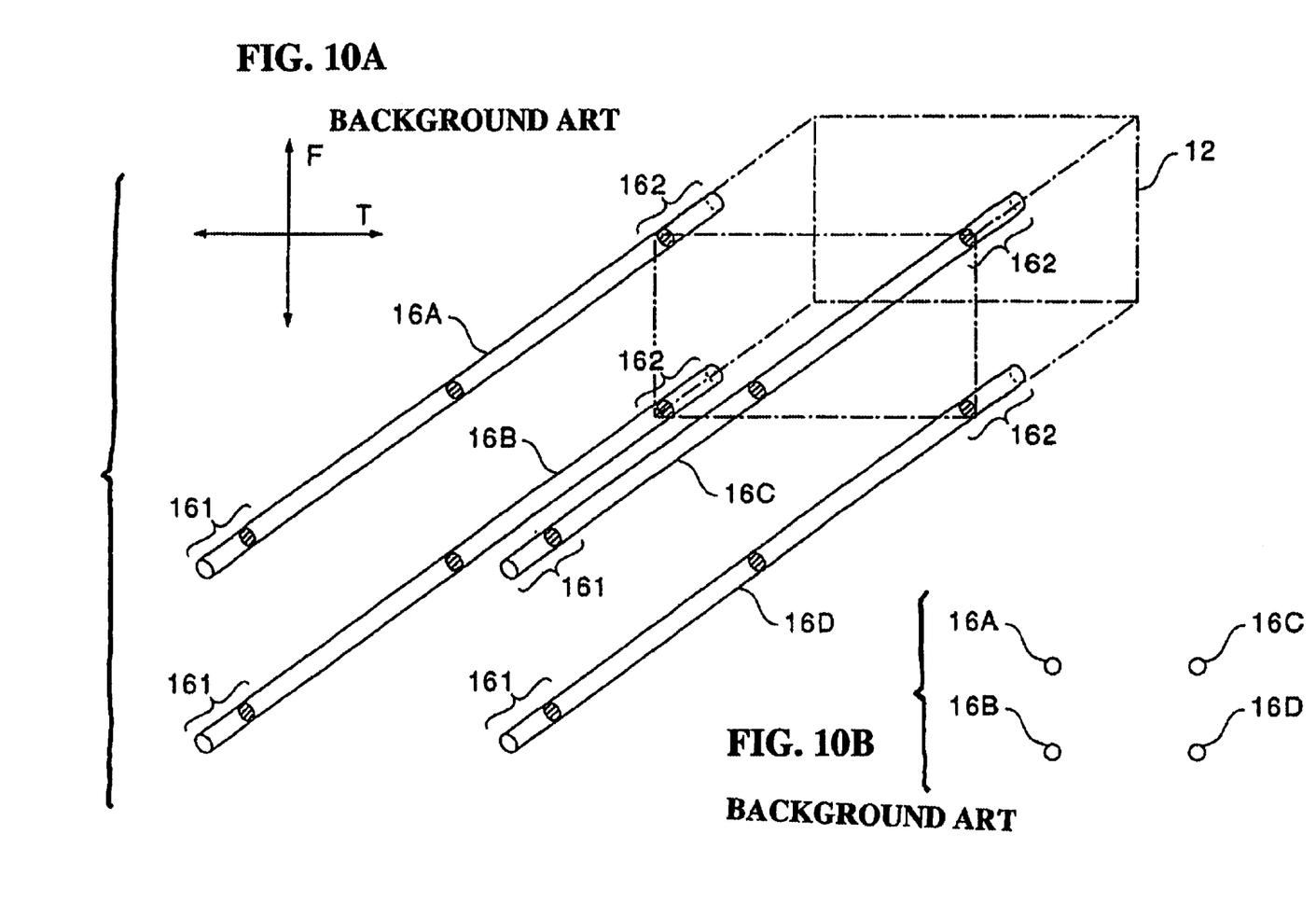
FIG. 10A is a schematic representation showing, in an enlarged manner, four wires supporting in a cantilever fashion a lens holder of a related optical pickup device.
FIG. 10B is an illustration for describing the positional relationship between the wires in FIG. 10A when viewed from the base ends of the wires.

As shown in FIG. 10A, the four wires 16A to 16D are arranged in parallel to each other such that they overlap in sets of two when viewed in either the focusing direction (designated by arrow F) or the tracking direction (designated by arrow T). As shown in FIG. 10B, when viewed from the base ends of the four wires 16A through 16D, the wires 16A through 16D are arranged independently of each other within a rectangular-parallelepiped space (with the shorter sides of the rectangular-parallelepiped space extending in the focusing direction and the longer sides thereof extending in the tracking direction). Further, each of the wires 16A to 16D is formed from a wire having a uniformly-circular cross section.

Demands exists for a more compact and slim optical pickup device 10. However, the optical pickup device 10, in which the lens holder 12 is supported by the wires 16A through 16D as described by reference to FIGS. 10A and 10B, cannot satisfy such a demand in many cases. For instance, realization of a compact and slim optical pickup device 10 involves high-density layout of components. However, the wires 16A through 16D are placed in the corners of the rectangular-parallelepiped space, as shown in FIGS. 10A and 10B, and hence this space becomes dead space.

When the related optical pickup device 10 has been made compact and slim, difficulty is encountered in moving the lens holder 12 appropriately in the focusing direction or in the tracking direction. If the lens holder 12 is made compact and slim in association with the optical pickup device 10 having been made compact and slim, the wires 16A through 16D become closer to each other in both the focusing and tracking directions. Accordingly, the attitude of the lens holder 12 during movement of the lens holder 12 in either the focusing or tracking direction becomes difficult to control. If the wires 16A to 16D become closer to each other in the focusing direction as a result of the lens holder 12 being made slim, the wires 16A through 16D become likely to twist in the focusing direction. Hence, when moved in the tracking direction, the lens holder 12 becomes likely to tilt. If the wires 16A through 16D become closer to each other in the tracking direction as a result of a decrease in the width of the lens holder 12, the wires 16A through 16D become likely to twist in the tracking direction. Accordingly, when moved in the focusing direction, the lens holder 12 becomes likely to tilt.

SUMMARY OF THE INVENTION

In the light of drawbacks of the related optical pickup device, the object of the present invention is to provide an optical pickup device which enables a reduction in dead space, even when adopting a construction of supporting a lens holder with four wires in view of effective feed of power.

Further, another object of the present invention is to provide an optical pickup device which enables a reduction in dead space and appropriate movement of a lens holder in both focusing and tracking directions, as well as to provide a method of manufacturing the optical pickup device.

In order to achieve the above objects, according to the present invention, there is provided an optical pickup device for an optical recording medium, comprising:

an objective lens for converging a laser beam onto the optical recording medium;

a lens holder for holding the objective lens;

fixation member;

four wires, first ends of which is supported by the fixation member, and second ends of which is connected to the lens holder; and a lens driver for moving the objective lens in a focusing direction and a tracking direction of the optical recording medium, by elastically deforming the four wires through use of a magnetic force, wherein the four wires are arranged so as to form two sets of wires and such that the two wires in each set overlap when viewed from at least one of the focusing direction and the tracking direction; and wherein the two wires in at least one set of the two sets are integrally fixed together.

In terms of use of four wires for feeding power to a lens holder, there is a commonality between the present invention and the related device. However, the present invention differs from the related device in that, of the two sets of wires arranged so as to overlap when viewed from the focusing or tracking direction, two wires of at least one of the two sets are integrally fixed together.

Preferably, the wires in a first set are integrally fixed together like one wire, while the wires in a second set are separated. In this configuration, the triangular arrangement of the four wires can reduce dead space to a greater extent than can a rectangular arrangement of four wires.

More preferably, the four wires are arranged so as to form an isosceles triangle when viewed from an extending direction of the wires. The wires in the first set are arranged in a position corresponding to an apex of the isosceles triangle, and the wires in the second set are arranged in positions corresponding to remaining vertices of the isosceles triangle. In this configuration, the deformation of the wires under a good balance can be realized.

Preferably, the set formed from the integrally-fixed two wires is arranged on the apex of an isosceles triangle, and the independent two wires of the other set are arranged on the remaining vertices of the isosceles triangle.

Preferably, the wires in each set are integrally fixed together like one wire. In this configuration, since the wires are arranged as if there were two wires, a dead space can be reduced to a greater extent than can rectangular arrangement of four wires.

Preferably, the wires are fixed together by heat sealing an insulative resin material. In this configuration, the wires can be readily insulated and bonded together.

Preferably, at least one wire is provided with a portion squeezed from at least one of the tracking direction and the focusing direction. If the wires are squeezed from the tracking direction, the wires are likely to deflect in the tracking direction but less likely to deflect in the focusing direction. Conversely, if the wires are squeezed from the focusing direction, the wires are likely to deflect in the focusing direction but less likely to deflect in the tracking direction. If the direction in which wires are to be squeezed is determined in accordance with specifications and characteristics of an optical pickup device, to thereby effect modification for imparting orientation to ease of flexure of the wires, there can be prevented occurrence of a failure, such as inclination of the lens holder (or an objective lens), which would otherwise be caused when the lens holder is moved in either the focusing or tracking direction. Since parts of wires are squeezed, the remaining portions of the wires become more easily deformed in the direction orthogonal to the direction in which the wires are squeezed. Ease of flexure of wires can be arbitrarily adjusted by determining the longitudinal extent over which the wires are to be squeezed or the thicknesswise extent to which the wires are to be squeezed. Even when there arises a necessity of adjusting the elasticity of the wires for appropriately moving the lens holder (objective lens) when the optical pickup device is made compact and slim, such a demand can be readily and appropriately satisfied, thus yielding an advantage of achieving a high degree of design freedom of the optical pickup device.

Preferably, the wires in each set are provided with a portion squeezed from at least one of the tracking direction and the focusing direction.

In this configuration, even when the wires are spaced closer to each other in the focusing direction, the wires are less likely to be distorted. Hence, the lens holder does not tilt when moved in the tracking direction. Since appropriate ease of flexure in the focusing direction still remains in the remaining portions of the wires, no problem is encountered in moving the lens holder (objective lens) in the focusing direction.

Conversely, in a case where portions of the respective four wires are squeezed from the focusing direction, the wires become less likely to be deformed in the tracking direction. Hence, if the wires are spaced closer to each other in the tracking direction when the width of the lens holder is made smaller, the wires are less likely to be distorted in the tracking direction. Hence, when moved in the focusing direction, the lens holder does not tilt. Since appropriate ease of flexure in the tracking direction still remains in the remaining portions of the wires, no problem is encountered in moving the lens holder (objective lens) in the tracking direction.

Preferably, the squeezed portion includes a first portion squeezed from the tracking direction and a second portion squeezed from the focusing direction. In this configuration, when the lens holder is moved in the focusing direction, the wires are deflected in the portions squeezed from the tracking direction. However, the thus-squeezed portions are less likely to deflect in the tracking direction, thus preventing inclination of the lens holder (objective lens). When the lens holder is moved in the tracking direction, the wires are deflected in the portions squeezed from the tracking direction. However, the thus-squeezed portions are less likely to deflect in the focusing direction, thus preventing inclination of the lens holder (objective lens). Further, since ease of flexure of the wires can be adjusted by determining the longitudinal range and thicknesswise extent over which the wires are to be squeezed, in accordance with specifications and characteristics of the optical pickup device, the characteristics of the wires can be adjusted and corrected, thereby yielding an advantage of great improvement in the degree of design freedom of an optical pickup device.

According to the present invention, there is also provided a manufacturing method of an optical pickup device for an optical pickup device, comprising the steps of:

providing a lens holder for holding an objective lens for converging a laser beam onto the optical recording medium, a fixation member, and four wires;

connecting the fixation member and the lens holder via the four wires such that the four wires are arranged so as to form two sets of wires, and such that the two wires in each set overlap when viewed from at least one of the focusing direction and the tracking direction; and squeezing a portion of at least one of the wires from at least one of a focusing direction and a tracking direction of the optical recording medium.

In this configuration, on the basis of actual movement of the lens holder (objective lens), the characteristics of the wires can be adjusted.

Preferably, the two wires arranged so as to overlap when viewed from at least one of the focusing direction and the tracking direction are squeezed simultaneously. Alternatively, the two wires in each set are squeezed simultaneously.

In this configuration, on the basis of actual movement of the lens holder (objective lens), the characteristics of the wires can be efficiently adjusted. Two wires to be squeezed simultaneously can be squeezed to substantially the same extent.

DETAILED DESCRIPTION OF THE PREFERRED EMBODIMENTS

Embodiments of the present invention will be described by reference to drawings. In the following descriptions, constituent elements as same as the related optical pickup device shown in FIGS. 8 and 9, such as an objective lens, a lens holder, and a magnetic drive circuit, are assigned the same reference numerals, and repeated explanation is omitted. Explanation will be given of only the feature of the present invention; that is, the construction of wires.

Figures 1A, 1B:
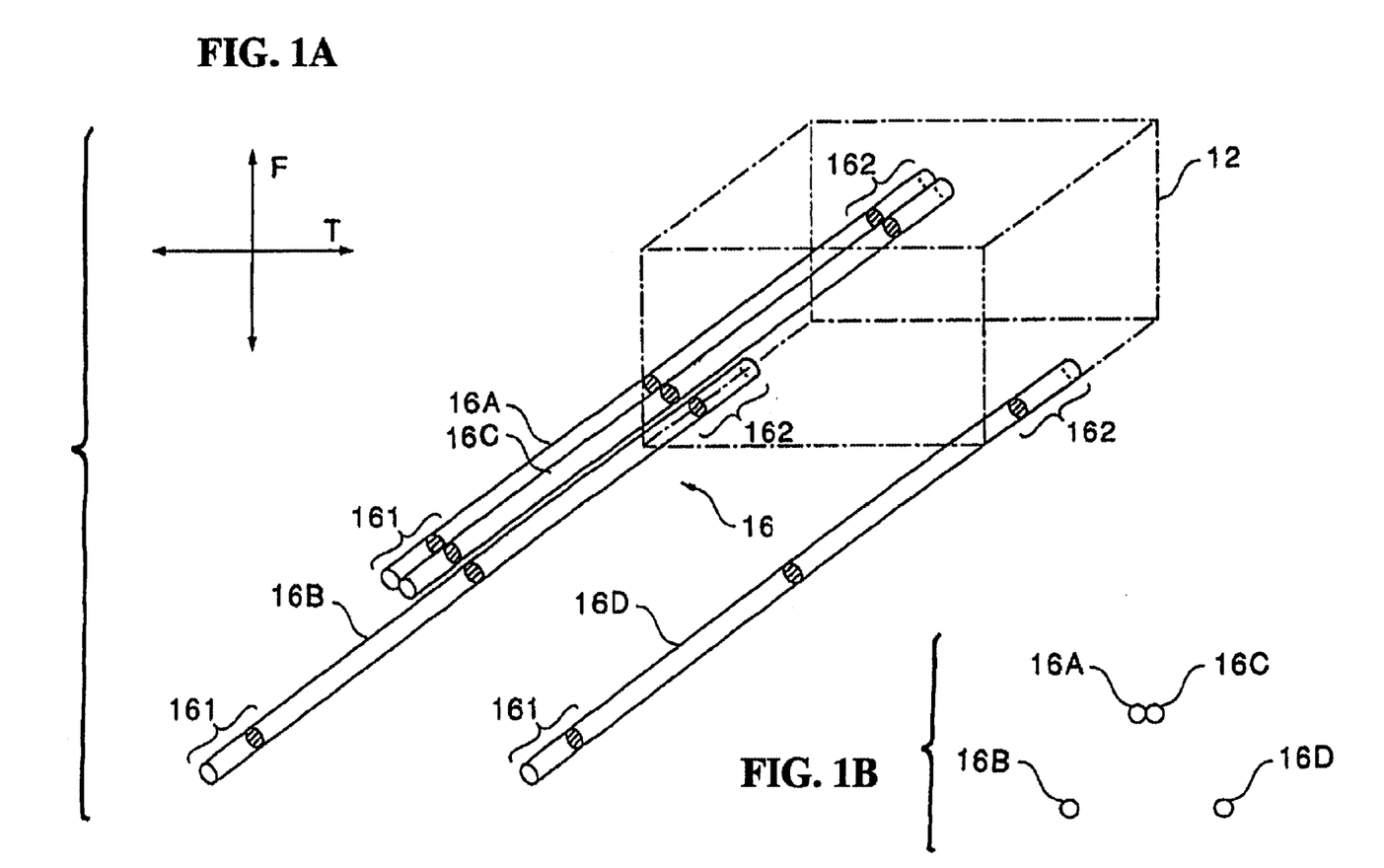
FIG. 1A is a schematic representation showing, in an enlarged manner, four wires supporting in a cantilever fashion a lens holder of an optical pickup device according to a first embodiment of the present invention.
FIG. 1B is an illustration for describing the positional relationship between the wires when viewed from the base ends of the wires.

FIG. 1A is a schematic representation showing, in an enlarged manner, four wires supporting in a cantilever fashion a lens holder of an optical pickup device according to a first embodiment of the present invention. FIG. 1B is an illustration for describing the positional relationship between the wires when viewed from the base ends of the wires.

As shown in FIG. 1A, four wires 16A through 16D support at their tip ends 162 the lens holder 12, and base ends 161 of the wires 16A through 16D are supported by a fixation member 110 (see FIGS. 8 and 9). The four wires 16A through 16D are arranged in two sets (a first set consisting of the wires 16A and 16C, and a second set consisting of the wires 16B and 16D) in parallel with each other such that in each set the two wires overlap when viewed from a tracking direction. The four wires 16A through 16D do not overlap when viewed from the focusing direction.

In the present embodiment, all the wires 16A through 16D are formed from a metal wire which has a uniformly-circular cross section in the longitudinal direction thereof. Further, the face of each of the wires 16A through 16D is coated with insulating material (not depicted) such as heat-sealable resin.

In the present embodiment, of the two wire sets, the two wires in one set (i.e., the first set consisting of the wires 16A and 16C) are fixed integrally with each other by heat sealing. The wires of the remaining set (i.e., the second set consisting of the wires 16B and 16D) are independent of each other.

As shown in FIG. 1B, the heat-sealed first set consisting of the wires 16A and 16C appears to be a single wire disposed at the apex of an isosceles triangle. Further, the wires 16B and 16D, which are independent of each other and constitute the second set, are disposed on the remaining vertices of the isosceles triangle.

As mentioned above, the optical pickup device according to the present embodiment is identical in configuration with the related optical pickup device in view of use of the four wires for the purpose of feeding power to the lens holder 12. The optical pickup device according to the present embodiment differs from the related optical pickup device in that, of the two sets of wires disposed so as to overlap when viewed from the tracking direction, the two wires 16A and 16C constituting the first set are integrally fixed together. In the present embodiment, the optical pickup device appears to be equipped with three wires. In contrast with a case where the four wires 16A through 16D are positioned at the respective corners of a rectangle, dead space can be diminished in the present embodiment.

Figures 2A, 2B:
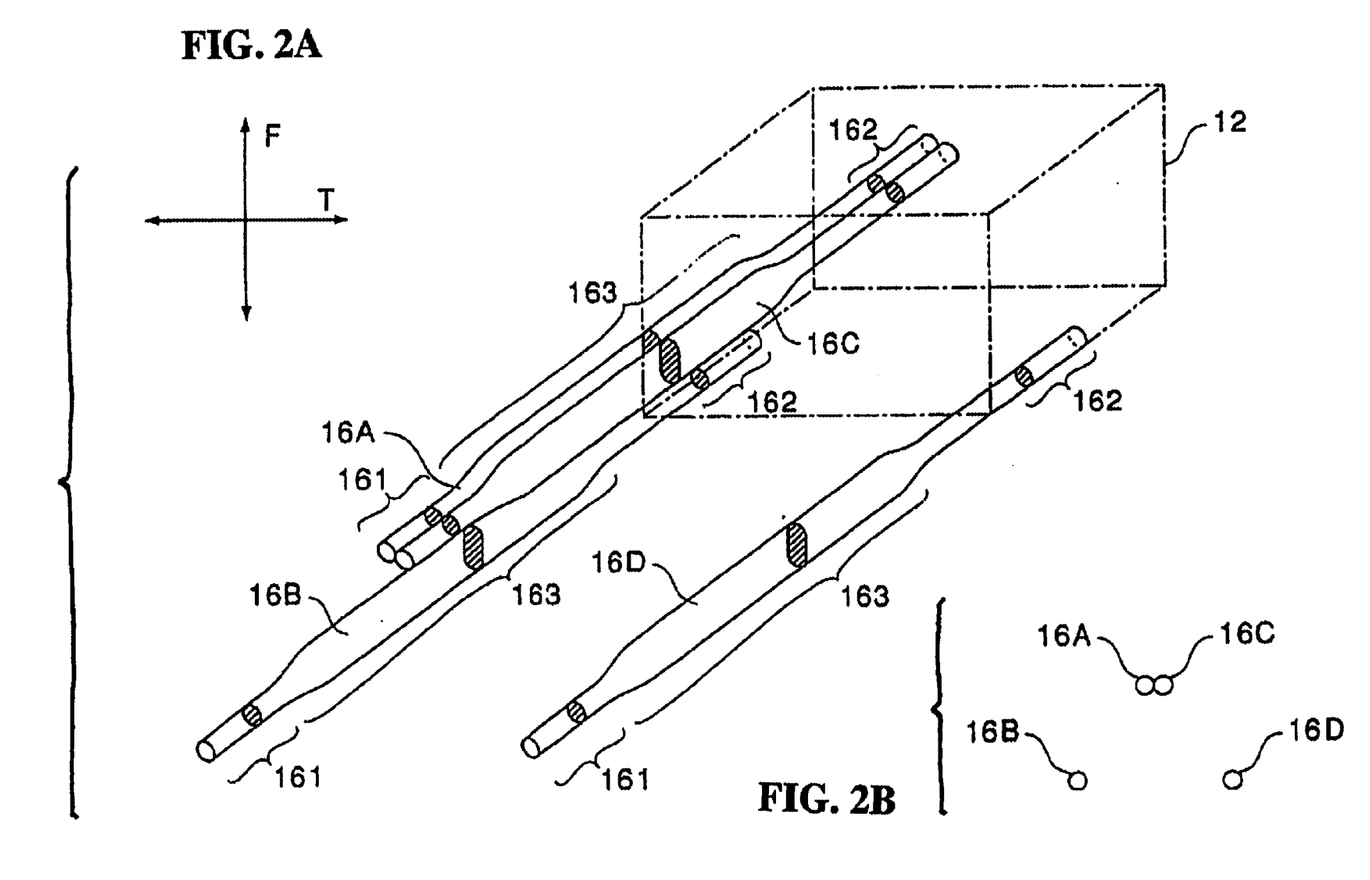
FIG. 2A is a schematic representation showing, in an enlarged manner, four wires supporting in a cantilever fashion a lens holder of an optical pickup device according to a second embodiment of the present invention.
FIG. 2B is an illustration for describing the positional relationship between the wires in FIG. 2A when viewed from the base ends of the wires.

FIG. 2A is a schematic representation showing, in an enlarged manner, four wires supporting in a cantilever fashion a lens holder of an optical pickup device according to a second embodiment of the present invention. FIG. 2B is an illustration for describing the positional relationship between the wires when viewed from the base ends of the wires.

As shown in FIG. 2A, the wires of the optical pickup device according to the present embodiment are positioned in the same layout as are the wires of the optical pickup device described in connection with the first embodiment. The faces of the wires 16A through 16D are coated with insulating material (not depicted) such as heat-sealable resin. Two wires constituting one set (i.e., the wires 16A and 16C constituting the first set) are integrally fixed together by heat sealing.

In the present embodiment, the opposite ends (i.e., the base end 161 and the tip end 162) of each of the four wires 16A through 16D have circular cross sections. However, a longitudinal center portion 163 of each of the wires 16A through 16D is squeezed from the tracking direction. As a result, the center portions 163 of the wires 16A through 16D have a longer diameter in the focusing direction and a shorter diameter in the tracking direction. The center portions 163 of the wires 16A through 16D are squeezed to the same extent in the tracking direction so as to become identical in size in the longitudinal direction.

These wires 16A through 16D are formed by press working in the tracking direction the center portions of wires having uniformly-circular cross sections, such as those shown in FIG. 1A.

As mentioned above, in the optical pickup device according to the present embodiment, portions (i.e., the center portions 163) of the wires 16A through 16D are squeezed in the tracking direction. Accordingly, the wires 16A to 16D are easily flexible in the tracking direction but less susceptible to flexure in the focusing direction. In the present embodiment, in accordance with specifications and characteristics of the optical pickup device, portions of the wires 16A through 16D are squeezed in the tracking direction, thus imparting orientation to flexure of the wires 16A through 16D. Accordingly, even if the distance between the wires 16A and 16B in the focusing direction and the distance between wires 16C and 16D in the focusing direction become shorter as a result of the lens holder 12 being made slim, the wires 16A through 16D are less distorted toward the focusing direction. Hence, when the lens holder 12 is moved in the tracking direction, the lens holder 12 (i.e., the objective lens 11) does not tilt.

Since longitudinal portions of the wires 16A through 16D are squeezed from the tracking direction, the wires 16A to 16D still retain appropriate ease of deflection in the focusing direction. For this reason, no problem is encountered in moving the lens holder 12 (i.e., the objective lens 11) in the focusing direction.

The ease of deflection of the wires 16A through 16D can be adjusted in accordance with the longitudinal range over which the wires are to be squeezed or the extent to which the wires are to be squeezed. Therefore, even if there may arise a necessity of finely adjusting the resilience of the wires 16A through 16D for appropriately driving the lens holder 12 (i.e., the objective lens 11) when the optical pickup device is made compact and slim, such a necessity can be readily and appropriately fulfilled. Thus, the degree of design freedom of an optical pickup device is high.

In the present embodiment, during the course of manufacture of the optical pickup device having the foregoing construction, the lens holder 12 is supported in a cantilever fashion by the wires 16A through 16D, each having a uniformly-circular cross section, as shown in FIG. 1A. On the basis of the result of actual movement of the lens holder 12 (i.e., the objective lens 11), longitudinal portions of the wires 16A through 16D are squeezed by press working, thus manufacturing the optical pickup device according to the present embodiment. The wires 16A and 16C, which have been bonded integrally, are squeezed simultaneously. On the basis of the result of actual movement of the lens holder 12 (i.e., the objective lens 11), the characteristics of the wires 16A through 16D are adjusted and corrected, thus optimizing the performance of the optical pickup device.

Figures 3A, 3B:
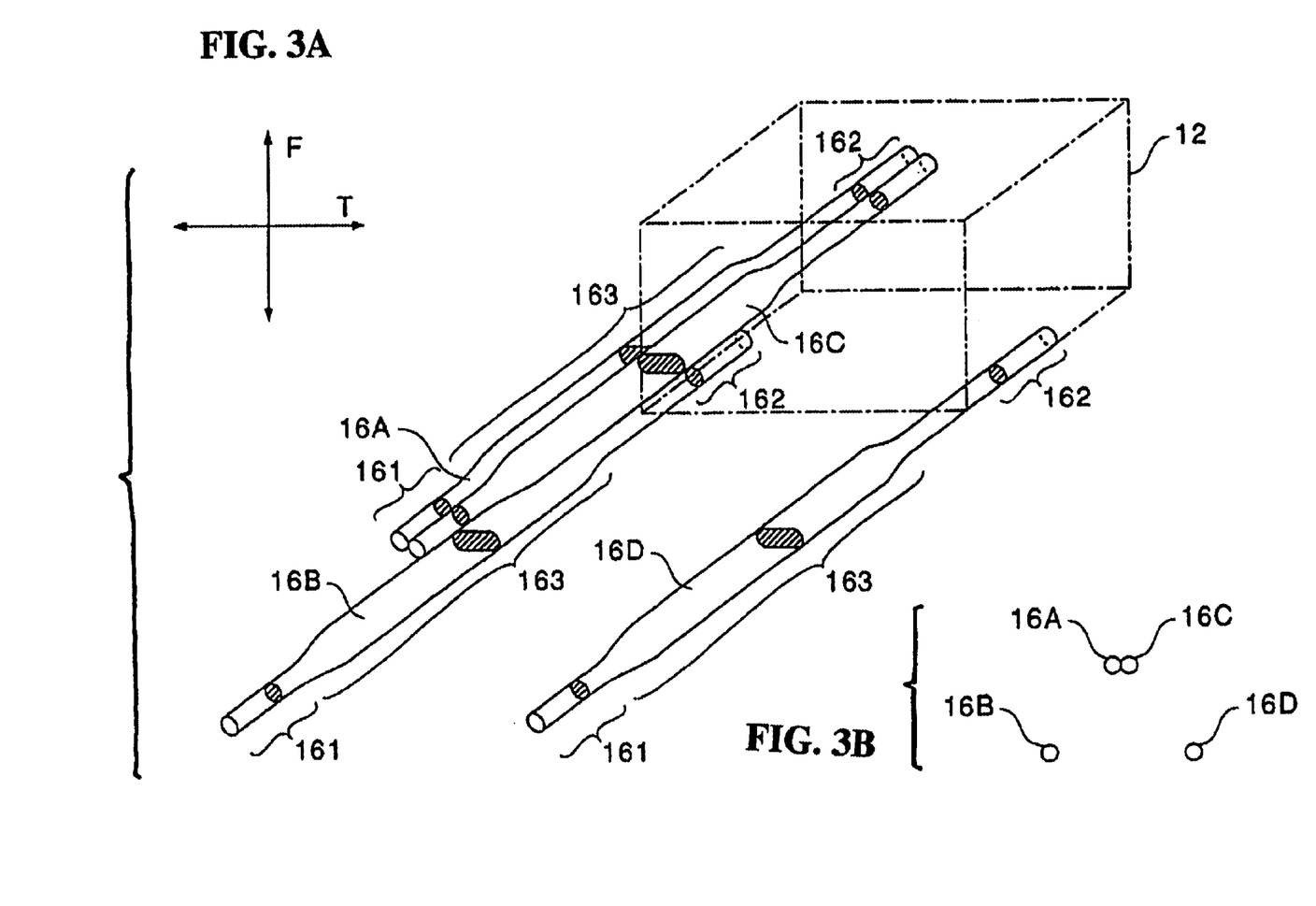
FIG. 3A is a schematic representation showing, in an enlarged manner, four wires supporting in a cantilever fashion a lens holder of an optical pickup device according to a third embodiment of the present invention.
FIG. 3B is an illustration for describing the positional relationship between the wires in FIG. 3A when viewed from the base ends of the wires.

FIG. 3A is a schematic representation showing, in an enlarged manner, four wires supporting in a cantilever fashion a lens holder of an optical pickup device according to a third embodiment of the present invention, and FIG. 3B is an illustration for describing the positional relationship between the wires when viewed from the base ends of the wires.

In the second embodiment the longitudinal center portions 163 of the wires 16A through 16D of the optical pickup device according are squeezed from the tracking direction. In contrast, in the present embodiment shown in FIG. 3A the longitudinal center portions 163 of the wires 16A through 16D of the optical pickup device are squeezed from the focusing direction. The center portions 163 of the wires 16A through 16D according to the present embodiment have a longer diameter in the tracking direction and a shorter diameter in the focusing direction.

The center portions 163 of the wires 16A through 16D which are shown in FIG. 1A and have uniformly circular cross sections are pressed in the focusing direction, thereby forming the wires 16A through 16D according to the present embodiment.

In such an optical pickup device, portions (i.e., the center portions 163) of the wires 16A through 16D are squeezed in the focusing direction. Accordingly, the wires 16A through 16D are likely to deflect in the focusing direction but less likely to deflect in the tracking direction. In the present embodiment, portions of the wires 16A through 16D are squeezed from the focusing direction in accordance with specifications and characteristics of the optical pickup device, thus imparting orientation to ease of flexure of the wires 16A through 16D. Accordingly, even if the distance between the wires 16A and 16C in the tracking direction and the distance between wires 16B and 16D in the tracking direction become shorter as a result of the lens holder 12 being made slim, the wires 16A through 16D are less distorted toward the tracking direction. Hence, when the lens holder 12 is moved in the focusing direction, the lens holder 12 (i.e., the objective lens 11) does not tilt.

In the course of manufacture of the optical pickup device having the foregoing construction the lens holder 12 is supported in a cantilever fashion by the wires 16A through 16D, each having a uniformly-circular cross section, in the same manner as that shown in FIG. 1A. On the basis of the result of actual movement of the lens holder 12 (i.e., the objective lens 11), longitudinal portions of the wires 16A through 16D are squeezed by press working, thus manufacturing the optical pickup device according to the present embodiment. At the time of press working, the wires 16A through 16D are arranged such that the wires overlap as if there were two wires when viewed from the tracking direction. The two wires 16A and 16C, which are arranged so as to overlap when viewed from the tracking direction, are squeezed simultaneously. The other two wires 16B and 16D are also squeezed simultaneously. Hence, adjustment and correction of characteristics of the optical pickup device can be effected efficiently. Further, there can be prevented occurrence of variations in the extent of deflection of the wires 16A through 16D.

Figures 4A, 4B:
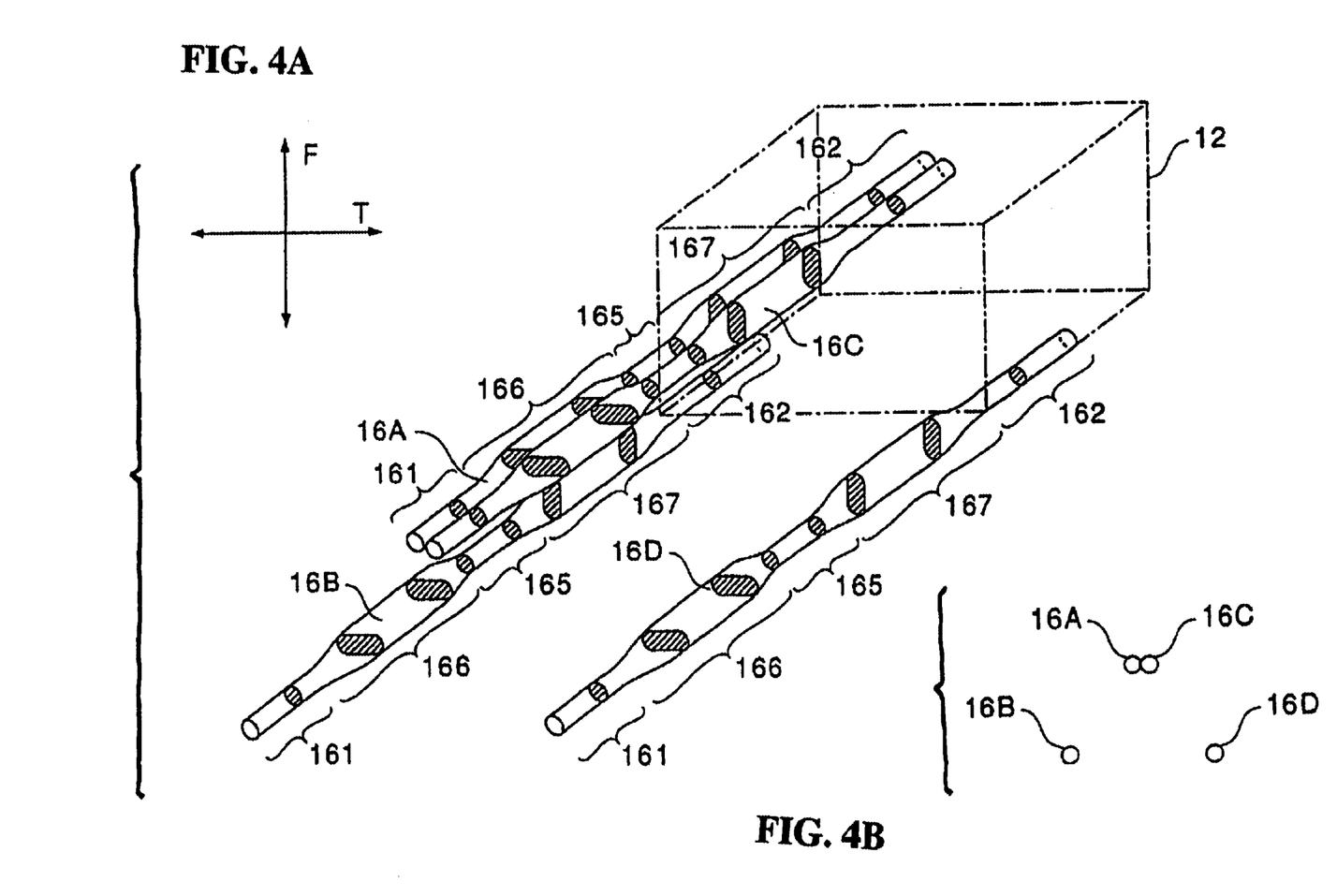
FIG. 4A is a schematic representation showing, in an enlarged manner, four wires supporting in a cantilever fashion a lens holder of an optical pickup device according to a fourth embodiment of the present invention.
FIG. 4B is an illustration for describing the positional relationship between the wires in FIG. 4A when viewed from the base ends of the wires.

FIG. 4A is a schematic representation showing, in an enlarged manner, four wires supporting in a cantilever fashion a lens holder of an optical pickup device according to a fourth embodiment of the present invention, and FIG. 4B is an illustration for describing the positional relationship between the wires when viewed from the base ends of the wires.

As shown in FIG. 4A, the optical pickup device according to the present embodiment is embodied by combination of the optical pickup device according to the second embodiment and the optical pickup device according to the third embodiment.

As shown in FIG. 4A, in the present embodiment, the opposite ends (i.e., the base end 161 and the tip end 162) and a longitudinal center portion 165 of each of the wires 16A through 16D assume a circular cross section. A portion 166 extending from the center portion 165 to the base end 161 is squeezed from the focusing direction, and a portion 167 extending from the center portion 165 to the tip end 162 is squeezed from the tracking direction. In other respects, the optical pickup device according to the present embodiment is identical in construction with those described in connection with the second and third embodiments.

As mentioned above, the portions 166 of the wires 16A through 16D close to the base ends 161 are pressed from the focusing direction in accordance with specifications and characteristics of the optical pickup device. The portions 167 of the wires 16A through 16D close to the tip ends 162 are pressed from the tracking direction. Thus, the wires 16A through 16D are subjected to modification, thereby imparting orientation to ease of flexure of the wires 16A through 16D. In the related optical pickup device, when the lens holder 12 is moved in the focusing direction, primarily the portions 166 close to the base ends 161 are deflected. However, in the present embodiment, the portions 166 are less likely to deflect in the tracking direction, thereby preventing twisting of the wires 16A through 16D in the tracking direction. Hence, even when the lens holder 12 is moved in the focusing direction, the lens holder 12 (or the objective lens 11) does not tilt.

When the lens holder 12 is moved in the tracking direction, primarily the portions 167 close to the tip ends 162 are deflected. However, in the present embodiment, the portions 167 are less likely to deflect in the focusing direction, thereby preventing twisting of the wires 16A through 16D in the focusing direction. Hence, even when the lens holder 12 is moved in the focusing direction, the lens 12 (or the objective lens 11) does not tilt.

The wires 16A and 16C integrated together are squeezed from the tracking direction simultaneously, as well as simultaneously from the focusing direction. Similarly, the other two wires 16B and 16D are also squeezed simultaneously.

Figures 5A, 5B:
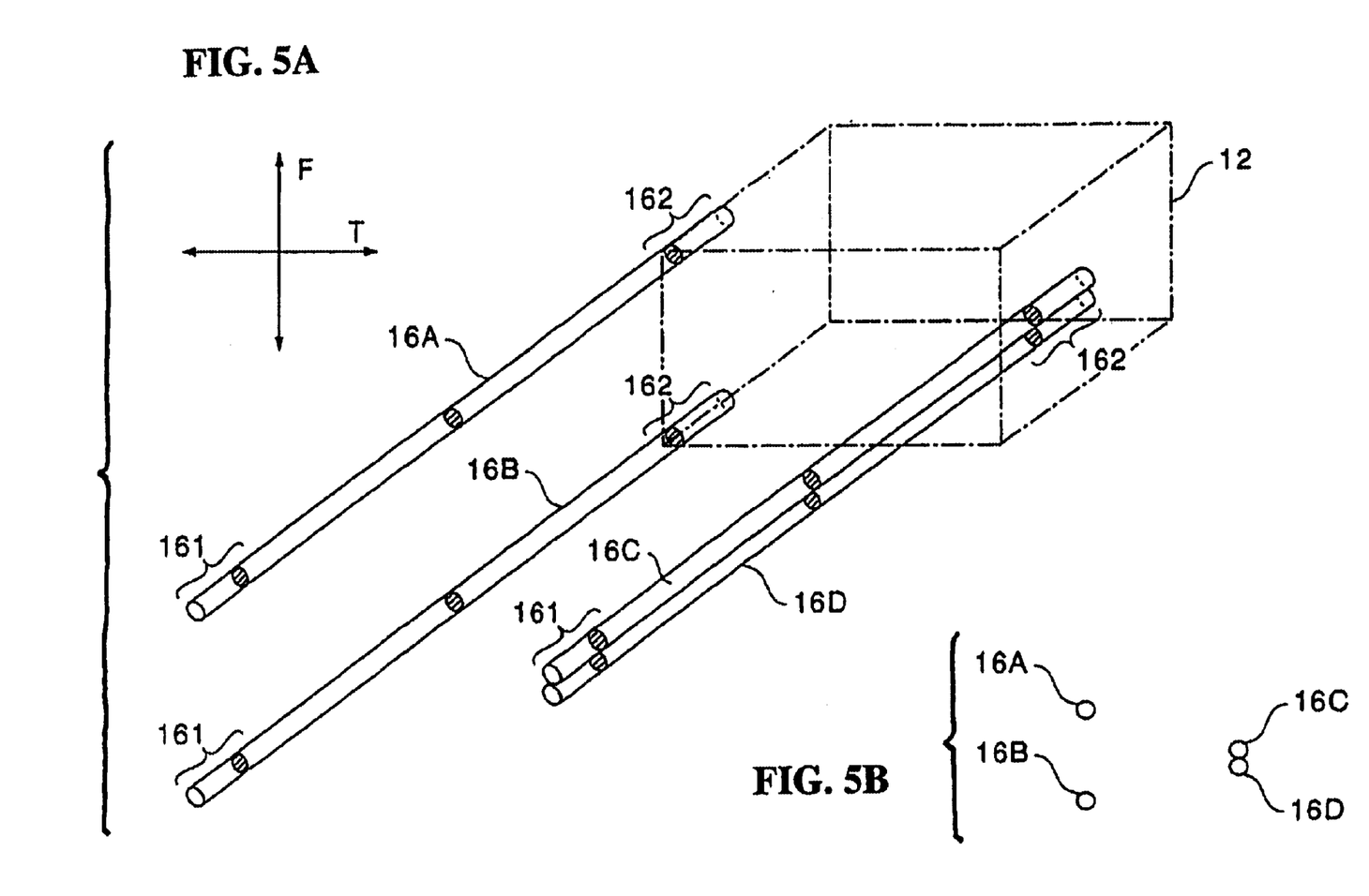
FIG. 5A is a schematic representation showing, in an enlarged manner, four wires supporting in a cantilever fashion a lens holder of an optical pickup device according to a fifth embodiment of the present invention.
FIG. 5B is an illustration for describing the positional relationship between the wires in FIG. 5A when viewed from the base ends of the wires.

FIG. 5A is a schematic representation showing, in an enlarged manner, four wires supporting in a cantilever fashion a lens holder of an optical pickup device according to a fifth embodiment of the present invention, and FIG. 5B is an illustration for describing the positional relationship between the wires when viewed from the base ends of the wires.

As shown in FIG. 5A, in the optical pickup device according to the present embodiment, the four wires 16A through 16D support at their tip ends 162 the lens holder 12. In contrast with embodiment 1, the wires of the optical pickup device according to the present embodiment consist of two sets of wires (i.e., a first set consisting of the wires 16A and 16B and a second set consisting of the wires 16C and 16D) which are arranged parallel with each other so as to appear to overlap when viewed from the focusing direction. The four wires 16A through 16D are arranged so as not to overlap when viewed from the tracking direction. In other respects, the optical pickup device according to the present embodiment is identical in construction with those described in connection with the first embodiment.

In the present embodiment, two wires constituting one set (i.e., the wires 16C and 16D constituting the second set) are integrally fixed together by heat sealing. The two wires of the remaining set (i.e., the wires 16A and 16B constituting the first set) are independent of each other.

Even in the present embodiment, the heat-sealed wires 16C and 16D constituting the second set are arranged as a single wire on the apex of an isosceles triangle. In contrast, the independent wires 16A and 16B constituting the first set are arranged on the remaining vertices of the isosceles triangle.

The second through fourth embodiments have been described as respective variants of the first embodiment in which the wires 16A through 16D are squeezed in the tracking direction, the wires 16A through 16D are squeezed in the focusing direction, and the wires 16A through 16D are squeezed in both the tracking and focusing directions. Similarly, the wires 16A through 16D according to the present embodiment may be squeezed from at least one of the tracking direction and the focusing direction.

Figures 6A, 6B:
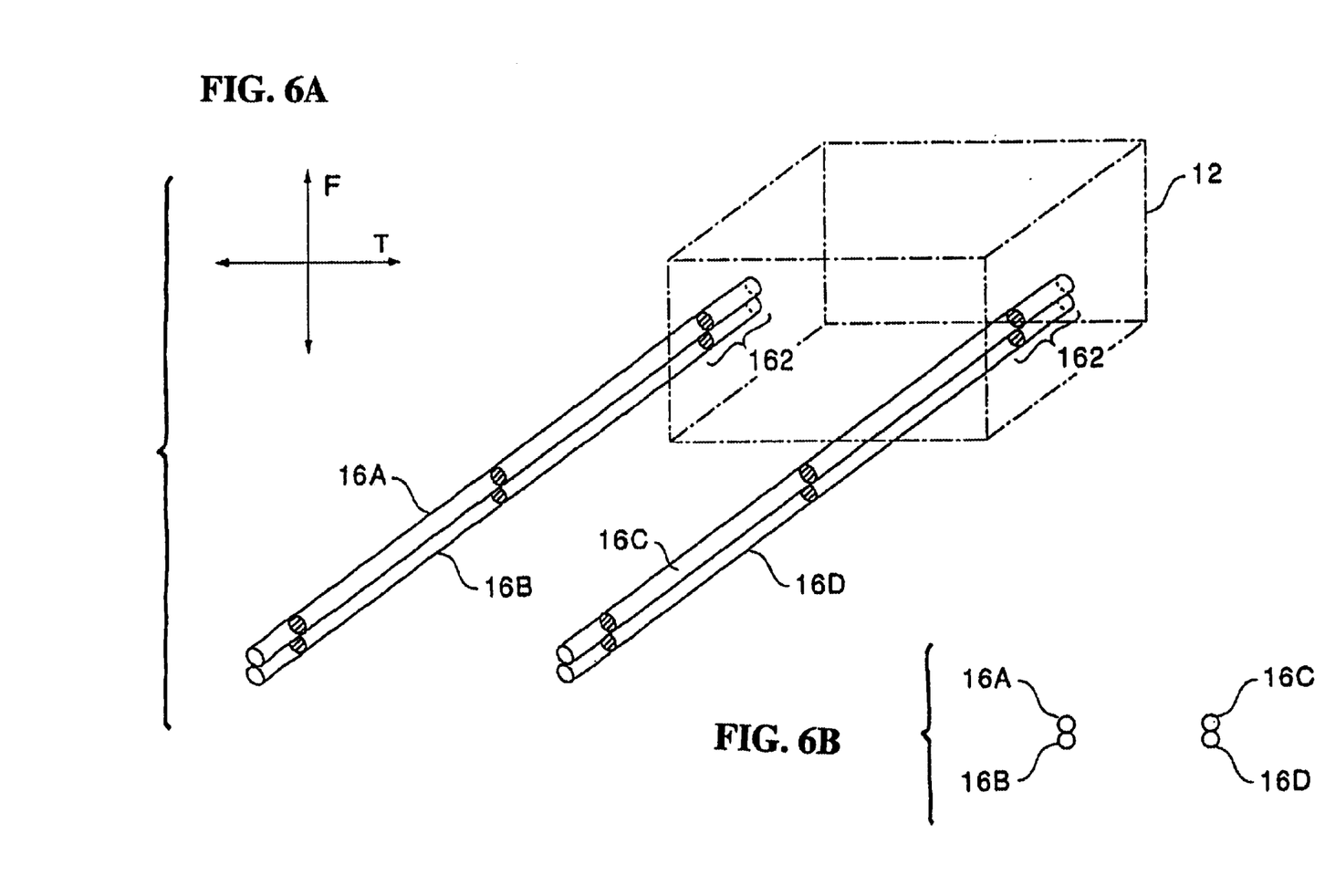
FIG. 6A is a schematic representation showing, in an enlarged manner, four wires supporting in a cantilever fashion a lens holder of an optical pickup device according to a sixth embodiment of the present invention.
FIG. 6B is an illustration for describing the positional relationship between the wires in FIG. 6A when viewed from the base ends of the wires.

FIG. 6A is a schematic representation showing, in an enlarged manner, four wires supporting in a cantilever fashion a lens holder of an optical pickup device according to a sixth embodiment of the present invention, and FIG. 6B is an illustration for describing the positional relationship between the wires when viewed from the base ends of the wires.

As shown in FIG. 6A, in the optical pickup device according to the present embodiment, the four wires 16A through 16D support at their tip ends 162 the lens holder 12. The wires 16A through 16D are arranged so as to overlap as if there were only two wires when viewed from either the tracking or focusing direction. In other respects, the optical pickup device according to the present embodiment is identical in construction with those described in connection with the first embodiment.

In the present embodiment, the wires are grouped into two sets of wires (i.e., a first set consisting of the wires 16A and 16B and a second set consisting of the wires 16C and 16D), which wires overlap when viewed from the focusing direction. Two wires constituting a set are integrally fixed together.

As shown in FIG. 6B, the heat-sealed wires 16A and 16B constituting the first set appear to be arranged as a single wire. Similarly, the heat-sealed wires 16C and 16D constituting the second set appear to be arranged as a single wire. Hence, in the present embodiment, the four wires are arranged as if there were two wires. Hence, the present embodiment can reduce dead space to a greater extent than can any of the first through fifth embodiments, in which the four wires are arranged on the apex and at the remaining vertices of an isosceles triangle.

The second through fourth embodiments have been described as respective variants of the first embodiment, in which the wires 16A through 16D are squeezed in the tracking direction, the wires 16A through 16D are squeezed in the focusing direction, and the wires 16A through 16D are squeezed in both the tracking and focusing directions. Similarly, the wires 16A through 16D according to the present embodiment may be squeezed from at least one of the tracking direction and the focusing direction.

Figures 7A, 7B:
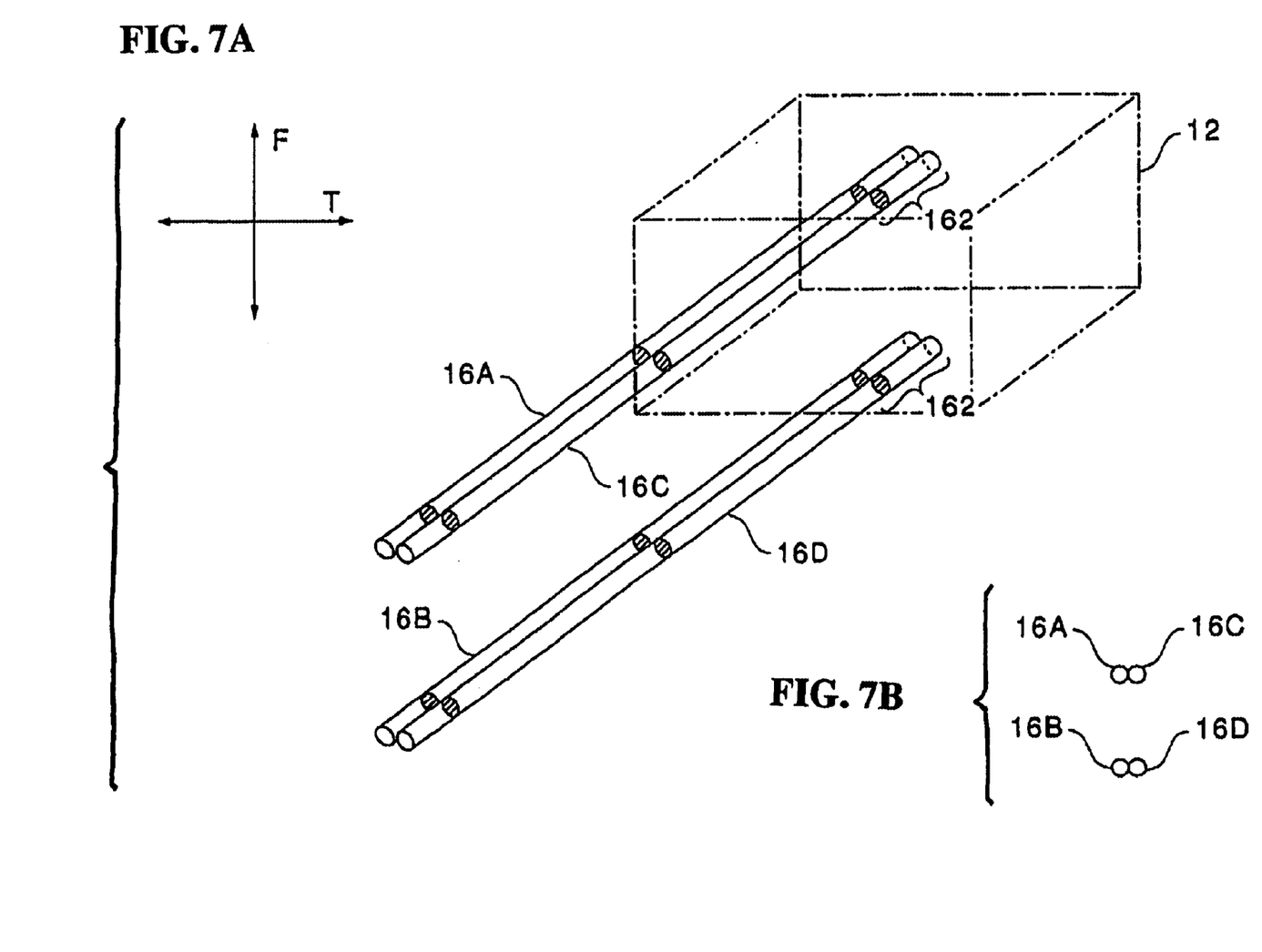
FIG. 7A is a schematic representation showing, in an enlarged manner, four wires supporting in a cantilever fashion a lens holder of an optical pickup device according to a seventh embodiment of the present invention.
FIG. 7B is an illustration for describing the positional relationship between the wires in FIG. 7A when viewed from the base ends of the wires.

FIG. 7A is a schematic representation showing, in an enlarged manner, four wires supporting in a cantilever fashion a lens holder of an optical pickup device according to a seventh embodiment of the present invention, and FIG. 7B is an illustration for describing the positional relationship between the wires when viewed from the base ends of the wires.

In the optical pickup device according to the sixth embodiment, in each of the two sets of wires overlapping when viewed from the focusing direction (i.e., the first set consisting of the wires 16A and 16B and the second set consisting of the wires 16C and 16D), two wires are integrally fixed together by heat sealing. In contrast, as shown in FIG. 7A, in each of two sets of wires overlapping when viewed from the tracking direction (i.e., a first set consisting of the wires 16A and 16C and a second set consisting of the wires 16B and 16D), two wires are integrally fixed together by heat sealing. The optical pickup device according to the present embodiment is identical in construction with that of the first embodiment, except for the positional relationship between the four wires.

The second through fourth embodiments have been described as respective variants of the first embodiment, in which the wires 16A through 16D are squeezed in the tracking direction, the wires 16A through 16D are squeezed in the focusing direction, and the wires 16A through 16D are squeezed in both the tracking and focusing directions. Similarly, the wires 16A through 16D according to the present embodiment may be squeezed from at least one of the tracking direction and the focusing direction.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical pickup device for an optical recording medium, comprising:

an objective lens for converging a laser beam onto the optical recording medium;

a lens holder for holding the objective lens;

a fixation member;

four wires, first ends of which is supported by the fixation member, and second ends of which is connected to the lens holder, the four wires extending in parallel with each other so as to form two pairs of wires; and a lens driver for moving the objective lens in a focusing direction and a tracking direction of the optical recording medium, by elastically deforming the four wires through use of a magnetic force, wherein at least one pair of wires are integrated along their entire longitudinal length.

2. The optical pickup device as set forth in claim 1, wherein the wires in a first pair are integrated, while the wires in a second pair are separated.

3. The optical pickup device as set forth in claim 2, wherein the four wires are arranged so as to form an isosceles triangle when viewed from the extending direction of the wires; and wherein the wires in the first pair are arranged in a position corresponding to an apex of the isosceles triangle, and the wires in the second pair are arranged in positions corresponding to remaining vertices of the isosceles triangle.

4. The optical pickup device as set forth in claim 1, wherein the wires in each pair are integrated.

5. The optical pickup device as set forth in claim 1, wherein the wires are integrated by heat sealing an insulative resin material.

6. The optical pickup device as set forth in claim 1, wherein at least one wire is provided with a portion squeezed from at least one of the tracking direction and the focusing direction.

7. The optical pickup device as set forth in claim 6, wherein the squeezed portion includes a first portion squeezed from the tracking direction and a second portion squeezed from the focusing direction.

8. The optical pickup device as set forth in claim 1, wherein the wires in each pair are provided with a portion squeezed from at least one of the tracking direction and the focusing direction.

9. The optical pickup device as set forth in claim 8, wherein the squeezed portion includes a first portion squeezed from the tracking direction and a second portion squeezed from the focusing direction.

10. The optical pickup device as set forth in claim 1, wherein the integrated wires are partly squeezed from a direction in which the integrated wires are arranged.

* * * * *